(12) United States Patent
Ikeda et al.

(10) Patent No.: US 7,481,488 B2
(45) Date of Patent: Jan. 27, 2009

(54) VEHICLE HOOD STRUCTURE

(75) Inventors: Koki Ikeda, Toyota (JP); Masaaki Morikawa, Toyota (JP); Hideki Ishitobi, Tokyo (JP)

(73) Assignee: Toyota Jidosha Kabushiki Kaisha, Tokoya-shi, Aichi-ken (JP)

( * ) Notice: Subject to any disclaimer, the term of this patent is extended or adjusted under 35 U.S.C. 154(b) by 182 days.

(21) Appl. No.: 10/946,211

(22) Filed: Sep. 22, 2004

(65) Prior Publication Data

US 2006/0163915 A1     Jul. 27, 2006

(30) Foreign Application Priority Data

Sep. 22, 2003    (JP)    ............... 2003-330033

(51) Int. Cl.
*B62D 25/10*    (2006.01)
(52) U.S. Cl. ............... 296/193.11; 296/187.09; 180/69.21
(58) Field of Classification Search ............ 296/187.04, 296/193.11, 76, 187.09; 180/69.22, 69, 69.23
See application file for complete search history.

(56) References Cited

U.S. PATENT DOCUMENTS

| | | | | |
|---|---|---|---|---|
| 5,124,191 A | * | 6/1992 | Seksaria | ............... 428/178 |
| 6,179,364 B1 | * | 1/2001 | Takahashi | ............... 296/76 |
| 6,793,275 B1 | * | 9/2004 | Chernoff et al. | ........ 296/193.11 |

FOREIGN PATENT DOCUMENTS

| | | |
|---|---|---|
| EP | 0 992 416 A2 | 4/2000 |
| JP | 62-163479 | 10/1987 |
| JP | 63-74334 | 5/1988 |
| JP | 1-144280 | 10/1989 |
| JP | 2-220979 | 9/1990 |
| JP | 05-155355 | 6/1993 |
| JP | 6-171548 | 6/1994 |
| JP | 11-198858 | 7/1999 |
| JP | 11/321713 | 11/1999 |
| JP | 2003-054449 | 2/2002 |
| JP | 2002-337742 | 11/2002 |
| JP | 2003-205866 | 7/2003 |
| JP | 2003-252246 | 9/2003 |
| WO | WO 02/47961 A1 | 6/2002 |

OTHER PUBLICATIONS

Japanese Office Action dated May 7, 2008.

* cited by examiner

*Primary Examiner*—Joseph D Pape
(74) *Attorney, Agent, or Firm*—Finnegan, Henderson, Farabow, Garrett & Dunner, LLP

(57) ABSTRACT

A vehicle hood structure of the present invention has: a hood outer panel structuring a vehicle body outer side surface of a hood; a hood inner panel disposed along an entire region of a reverse surface of the hood outer panel, a cross-sectional configuration of the hood inner panel as seen from a vehicle longitudinal direction being a wavy configuration; and shelf portions formed along the vehicle longitudinal direction at side wall portions of the wavy cross-sectional configuration, wherein the cross-sectional configuration of a wavy configuration, of the hood inner panel, is formed along the vehicle longitudinal direction.

6 Claims, 17 Drawing Sheets

VEHICLE HOOD STRUCTURE

CROSS-REFERENCE TO RELATED APPLICATION

This application claims priority under 35 USC 119 from Japanese Patent Application No. 2003-330033, the disclosure of which are incorporated by reference herein.

BACKGROUND OF THE INVENTION

1. Field of the Invention

The present invention relates to a vehicle hood structure, and in particular, to a vehicle hood structure which is used in a vehicle such as an automobile or the like and which protects a colliding body at the time of a collision.

2. Description of the Related Art

In a vehicle hood structure which is applied to a vehicle such as an automobile or the like, a structure is conventionally known in which the interval between a hood outer panel and a hood inner panel is made to be larger at the rear half portion of the hood in the vehicle longitudinal direction than at the front half portion thereof (see, for example, Japanese Patent Application Laid-Open (JP-A) No. 11-321713).

However, in this vehicle hood structure disclosed in JP-A No. 11-321713, the front half portion of the hood has low rigidity, and the general properties intrinsic to the hood (torsional rigidity, tensile rigidity, and the like) are poor. Further, at the rear half portion of the hood, the interval between the hood inner panel and the members beneath the hood is narrower than at the front half portion.

Therefore, when a colliding body collides with the front half portion of the hood, the hood inner panel deforms locally, and the amount of energy absorbed at the time of the primary collision cannot be ensured.

Further, when a colliding body collides with the rear half portion of the hood, the secondary collision between the hood inner panel and the members beneath the hood begins during the time that the energy cannot be sufficiently absorbed. As a result, the impact which the colliding body receives at the time of the secondary collision is large.

SUMMARY OF THE INVENTION

In view of the aforementioned, an object of the present invention is to provide a vehicle hood structure in which energy is sufficiently absorbed at the time of a primary collision, and the impact received by a colliding body due to a secondary collision can be lessened.

In a first aspect of the present invention, a vehicle hood structure has: a hood outer panel structuring a vehicle body outer side surface of a hood; a hood inner panel disposed along an entire region of a reverse surface of the hood outer panel, a cross-sectional configuration of the hood inner panel as seen from a vehicle longitudinal direction being a wavy configuration; and shelf portions formed along the vehicle longitudinal direction at side wall portions of the wavy cross-sectional configuration, wherein the cross-sectional configuration of a wavy configuration, of the hood inner panel, is formed along the vehicle longitudinal direction.

In the present aspect, at the hood inner panel, which is disposed along the entire region of the reverse surface of the hood outer panel of the hood and whose cross-sectional configuration as seen from a vehicle longitudinal direction is a wavy configuration, shelf portions are formed along the vehicle longitudinal direction at side wall portions of the wavy cross-sectional configuration. Owing to these shelf portions, the rigidity of the hood is increased, and accordingly, sufficient energy absorption at the time of a primary collision is possible. As a result, the impact which a colliding body receives at the time of a secondary collision can be reduced.

In addition, also at the time of a secondary collision, the frame (skeleton) cross-section is easily crushed with the shelf portions being the starting points. Thus, a reduction in the peak acceleration at the time of a secondary collision is possible.

In a second aspect of the present invention, a vehicle hood structure has: a hood outer panel structuring a vehicle body outer side surface of a hood; a hood inner panel disposed along a reverse surface of the hood outer panel, a cross-sectional configuration of the hood inner panel as seen from a vehicle longitudinal direction being a hat-shaped configuration whose opening is directed upwardly; and shelf portions formed along the vehicle longitudinal direction at side wall portions of the hat-shaped cross-sectional configuration, wherein the cross-sectional configuration of a hat-shaped configuration whose opening is directed upwardly, of the hood inner panel, is formed along the vehicle longitudinal direction.

In the present aspect, at the hood inner panel, which is disposed along the reverse surface of the hood outer panel of the hood and whose cross-sectional configuration as seen from a vehicle longitudinal direction is a hat-shaped configuration whose opening is directed upwardly, shelf portions are formed along the vehicle longitudinal direction at side wall portions of the hat-shaped cross-sectional configuration. Owing to these shelf portions, the rigidity of the hood is increased, and accordingly, sufficient energy absorption at the time of a primary collision is possible. As a result, the impact which a colliding body receives at the time of a secondary collision can be reduced.

In a third aspect of the present invention, a vehicle hood structure has: a hood outer panel structuring a vehicle body outer side surface of a hood; a hood inner panel disposed along an entire region of a reverse surface of the hood outer panel, a cross-sectional configuration of the hood inner panel as seen from a vehicle longitudinal direction being a wavy configuration; and recessed beads formed along the vehicle longitudinal direction at peak portions of the wavy cross-sectional configuration, wherein the cross-sectional configuration of a wavy configuration, of the hood inner panel, is formed along the vehicle longitudinal direction.

In the present aspect, at the hood inner panel which is disposed along the entire region of the reverse surface of the hood outer panel of the hood and whose cross-sectional configuration as seen from a vehicle longitudinal direction is a wavy configuration, recessed beads are formed along the vehicle longitudinal direction at peak portions of the wavy cross-sectional configuration. Owing to the recessed beads, the rigidity of the hood is increased, and accordingly, sufficient energy absorption is possible over a wide range in which local deformation at the time of a primary collision is suppressed. As a result, the impact which a colliding body receives at the time of a secondary collision can be reduced.

DETAILED DESCRIPTION OF THE INVENTION

Figure 1:
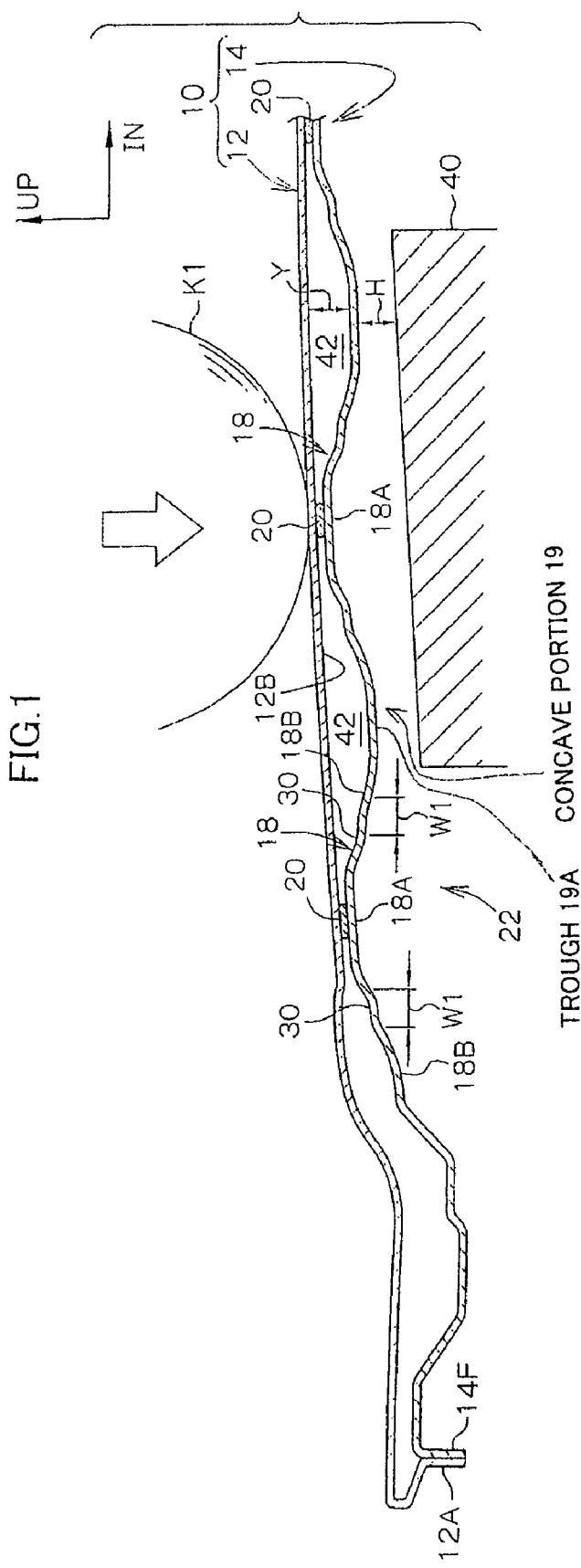
FIG. 1 is an enlarged sectional view taken along line 1-1 of FIG. 4.

A first embodiment of a vehicle hood structure of the present invention will be described in accordance with FIGS. 1 through 7.

Note that, in the drawings, arrow UP designates the upward direction of the vehicle, arrow FR designates the front direction of the vehicle, and arrow IN designates the direction toward the vehicle interior along the vehicle transverse direction.

Figure 5:
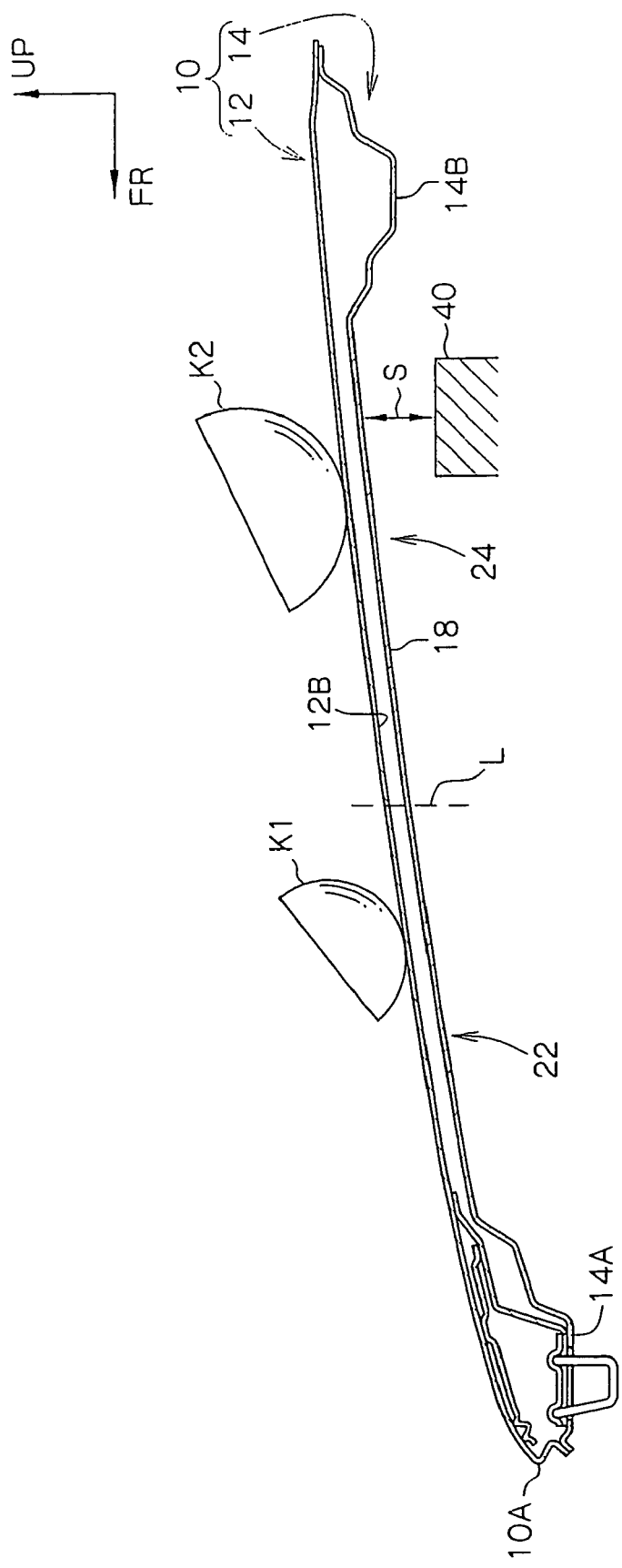
FIG. 5 is an enlarged sectional view taken along line 5-5 of FIG. 4.

As shown in FIG. 5, a hood 10 of the present embodiment has a hood outer panel 12 which structures the vehicle body outer side surface of the hood 10, and a hood inner panel 14 which is disposed over the entirety of the hood inner side (the reverse surface side) of the hood outer panel 12 and structures the inner side portion of the hood 10, such that the hood 10 is a completely hollow structure.

Figure 4:
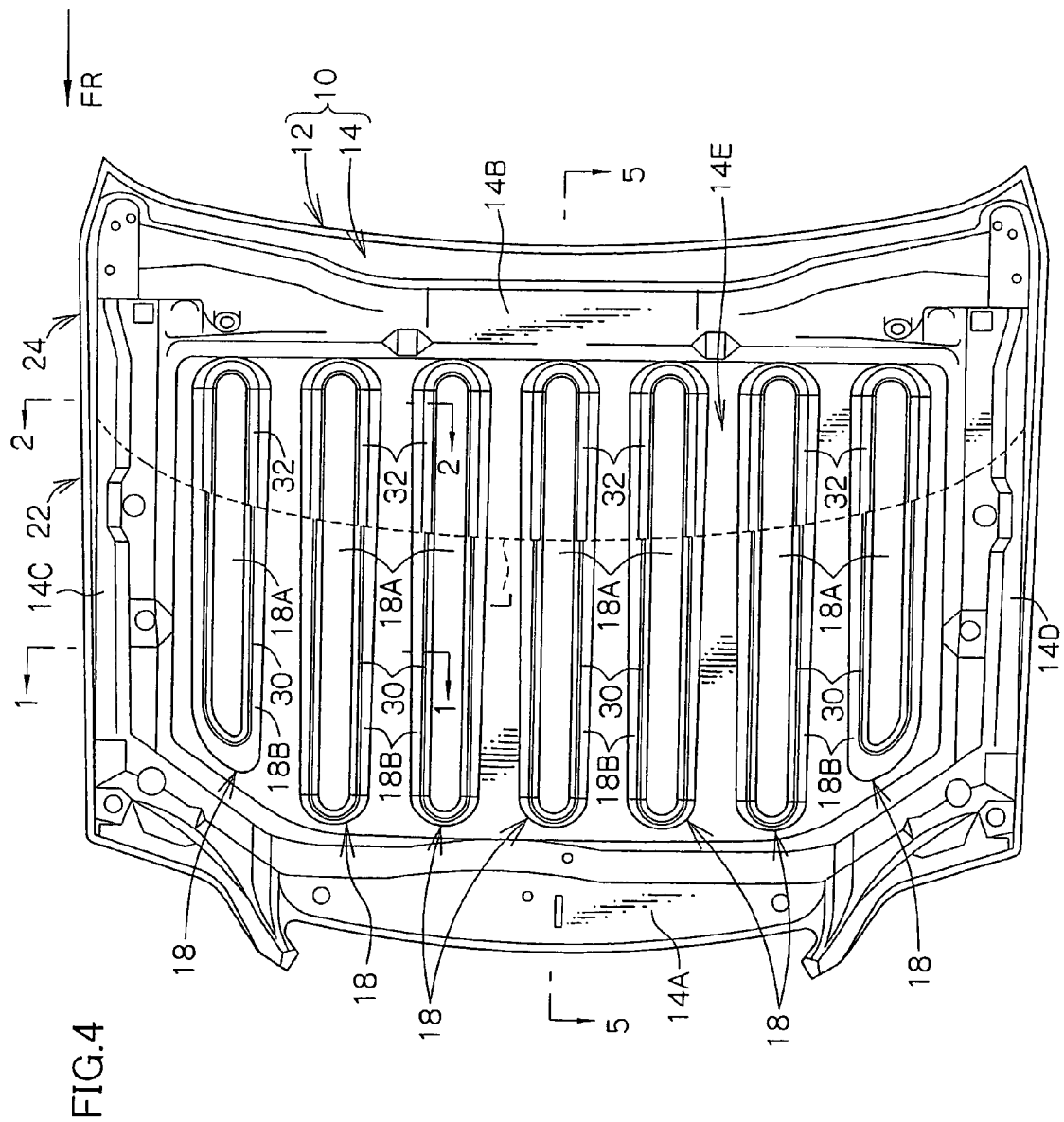
FIG. 4 is a plan view, as seen from below the vehicle body, showing the vehicle hood structure relating to the first embodiment of the present invention.

As shown in FIG. 4, a plurality of convex portions 18 are formed along the vehicle longitudinal direction at predetermined intervals in the vehicle transverse direction, at a central region 14E of the hood inner panel 14, which is other than a front end edge portion 14A, a rear end edge portion 14B, and left and right vehicle transverse direction outer side edge portions 14C, 14D which are the outer peripheral edge portions of the hood inner panel 14.

As shown in FIG. 1, the cross-sectional configuration of the hood inner panel 14 as seen from the vehicle longitudinal direction is wavy due to the convex portions 18. Further, flanges 12A are formed so as to be directed toward the bottom of the vehicle body at the vehicle transverse direction both end portions of the hood outer panel 12. The flanges 12A are connected to flanges 14F which are formed so as to be directed toward the bottom of the vehicle body at the vehicle transverse direction both end portions of the hood inner panel 14.

The convex portions 18 of the hood inner panel 14 swell toward the top of the vehicle body. Central portions, in the vehicle transverse direction, of peak portions 18A of the convex portions 18 are joined to a reverse surface 12B of the hood outer panel 12 by an adhesive 20.

The convex portions 18 are formed along a vehicle longitudinal direction at intervals in a vehicle transverse direction and concave portions are formed along a vehicle longitudinal direction at intervals in a vehicle transverse direction. The convex portions 18 include side wall portions 18B and each side wall portion 18B is positioned between a peak of a convex portion 18 and a trough 19A of an adjacent concave portion 19.

As shown in FIG. 4, the convex portions 18 of the hood inner panel 14 extend from the front end portion of the central region 14E to the rear end portion thereof. A border line L is set at the hood inner panel 14 of the hood 10 at the intermediate portion thereof in the longitudinal direction of the vehicle. The portion of the hood inner panel 14 at the front side of this border line L is front half portion 22, and the portion at the rear side of the border line L is rear half portion 24.

The border line L is formed, in plan view, in the shape of an arc which runs along a front end edge portion 10A of the hood 10.

Shelf portions 30 serving as rigidity strengthening portions are formed along the vehicle longitudinal direction at the vertical direction intermediate portions of side wall portions 18B, whose cross-sectional configurations are wavy, of the convex portions 18 at the front half portion 22 of the hood inner panel 14 shown in FIG. 1.

Figure 2:
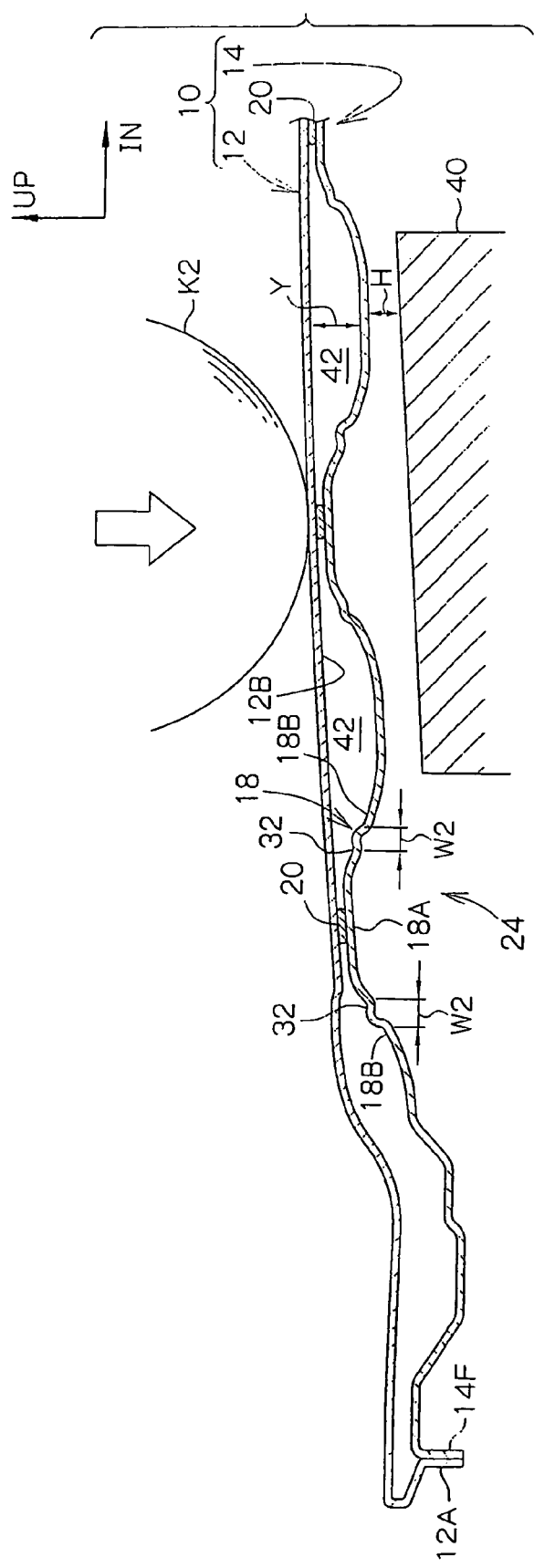
FIG. 2 is an enlarged sectional view taken along line 2-2 of FIG. 4.
Figure 3:
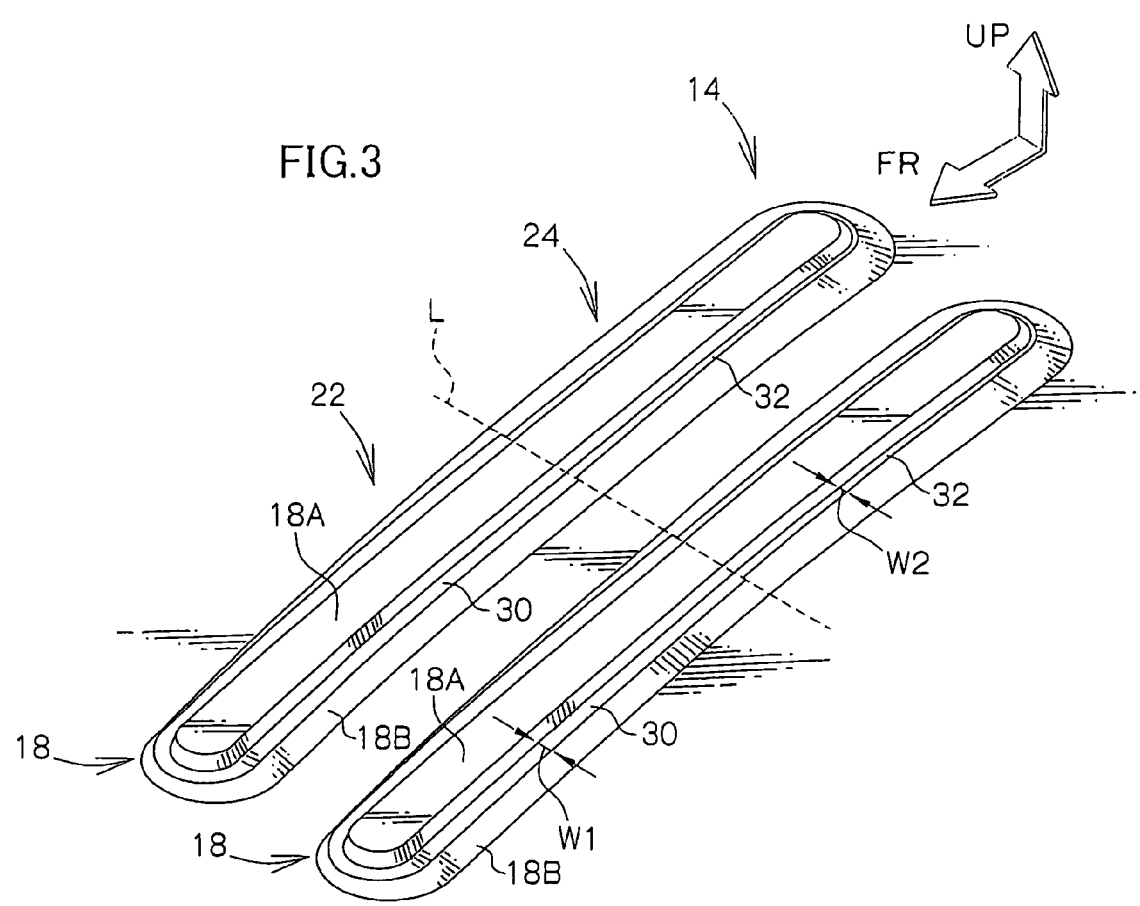
FIG. 3 is a perspective view, as seen from the front of a vehicle body and at an angle, showing a portion of a hood inner panel of a vehicle hood structure relating to a first embodiment of the present invention.

Shelf portion 32 serving as rigidity strengthening portions are formed along the vehicle longitudinal direction at the vertical direction intermediate portions of the convex portions 18 at the rear half portion 24 of the hood inner panel 14 shown in FIG. 2.

As compared with a vehicle transverse direction width W1 of the shelf portion 30 at the front half portion 22 of the hood inner panel 14 as shown in FIG. 1, a vehicle transverse direction width W2 of the shelf portion 32 at the rear half portion 24 of the hood inner panel 14 is smaller as shown in FIG. 2 (W1>W2). However, it should be noted that it is possible to set W1 and W2 such that W1=W2 or W1<W2, as long as the impact absorbing ability is well controlled by appropriately setting W1 and W2 in accordance with the relationship between the hood 10 and the structures within the engine room and in accordance with the configuration (the longitudinal length and the like) of the hood 10.

Note that heights Y of the convex portions 18 and the intervals (the pitch) between adjacent convex portions 18 are the same at the front half portion 22 and the rear half portion 24 of the hood inner panel 14. Further, a member 40 positioned beneath the hood inner panel 14 is a rigid body such as the engine or the like.

Next, the operation of the present embodiment will be described.

In the present embodiment, at the front half portion 22 of the hood inner panel 14, the shelf portions 30 are formed along the vehicle longitudinal direction at the side wall portions 18B of the convex portions 18. Therefore, owing to these shelf portions 30, the rigidity of the front half portion 22 of the hood inner panel 14 is increased. As a result, at the front half portion 22 of the hood inner panel 14, sufficient energy absorption at the time of a primary collision is possible, and therefore, the impact received by a colliding body K1 due to a secondary collision can be lessened.

In the present embodiment, the width W2, in the vehicle transverse direction, of the shelf portion 32 at the rear half portion 24 of the hood inner panel 14 is narrow as compared with the width W1, in the vehicle transverse direction, of the shelf portion 30 at the front half portion 22 of the hood inner panel 14 (W1>W2).

Therefore, as shown in FIG. 5, when colliding bodies K1, K2 collide with the hood outer panel 12, as shown in FIG. 2, the amount of deformation, toward the bottom of the vehicle, of the hood 10 at the rear half portion 24 of the hood inner panel 14 which portion tends to be collided by the colliding body K2 having a large mass, can be controlled not to be so large as compared with the amount of deformation, toward the bottom of the vehicle, of the hood 10 at the front half portion 22 of the hood inner panel 14 which portion tends to be collided by the colliding body K1 having a small mass.

Figure 6:
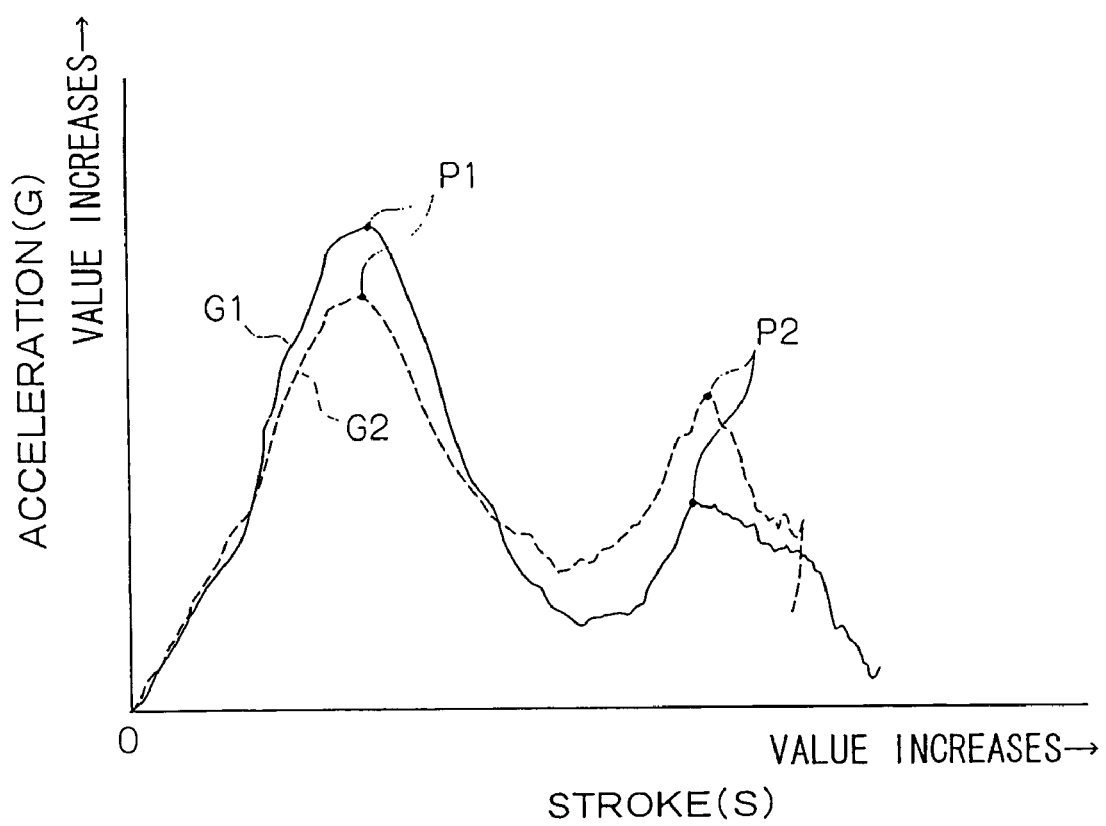
FIG. 6 is a graph showing the relationship between acceleration and the stroke of a colliding body in the vehicle hood structure relating to the first embodiment of the present invention.

As a result, as shown in FIG. 6, with regard to the change in acceleration G1 in relation to stroke S of the colliding body K2 in the present embodiment, the rise at the initial stage of the collision is fast and the acceleration of primary peak P1 is high therein, as compared with the change in acceleration G2 in relation to the stroke S of the colliding body K2 in a structure which does not have the shelf portions 32. Thus, energy can be absorbed efficiently at the stage when the collision speed of the colliding body K2 is fast. Therefore, when the colliding body K2 collides with the member 40 under the hood, the acceleration of secondary peak P2 at acceleration G1 is low as compared with that at acceleration G2. Accordingly, in the present embodiment, the impact which the colliding body K2 receives due to the secondary collision can be reduced.

Figure 7:
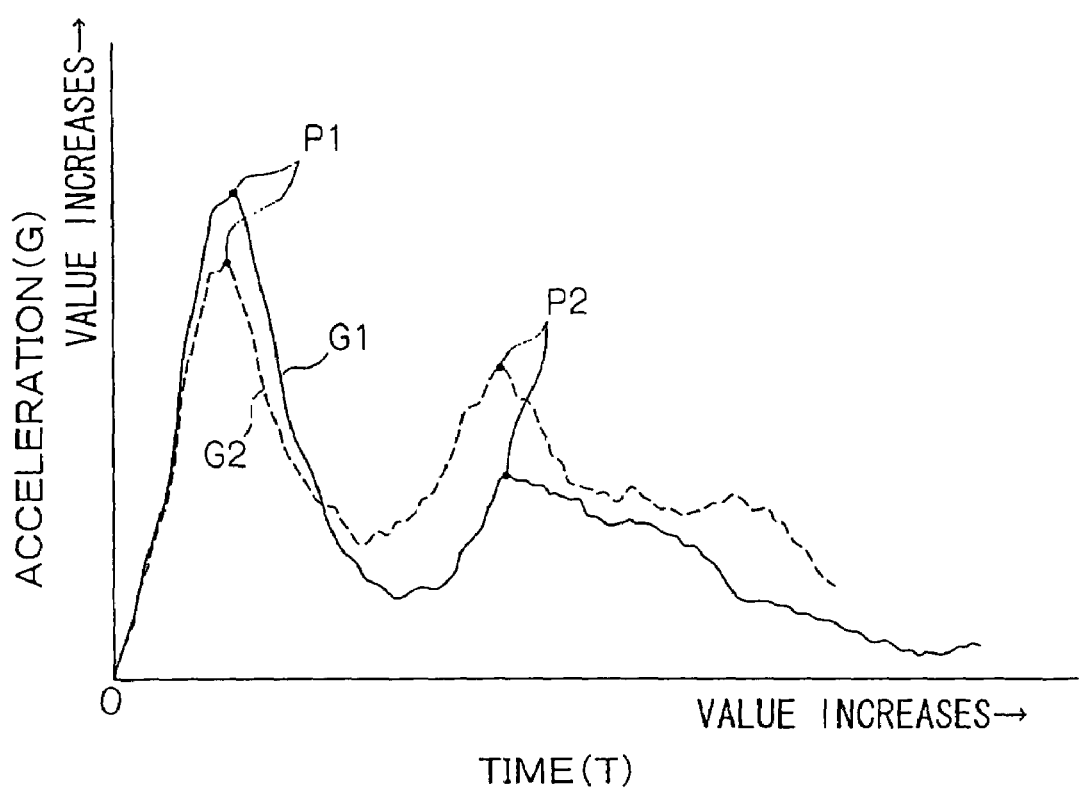
FIG. 7 is a graph showing the relationship between acceleration and time after a collision in the vehicle hood structure relating to the first embodiment of the present invention.

Further, the change in the acceleration G1 in relation to time T after the collision of the colliding body K2 in the present embodiment is as shown in FIG. 7.

Accordingly, in the present embodiment, the impact which the colliding body K2 receives due to a secondary collision can be decreased over the entire region of the hood 10 corresponding to the front half portion 22 and the rear half portion 24 of the hood inner panel 14.

Figure 8:
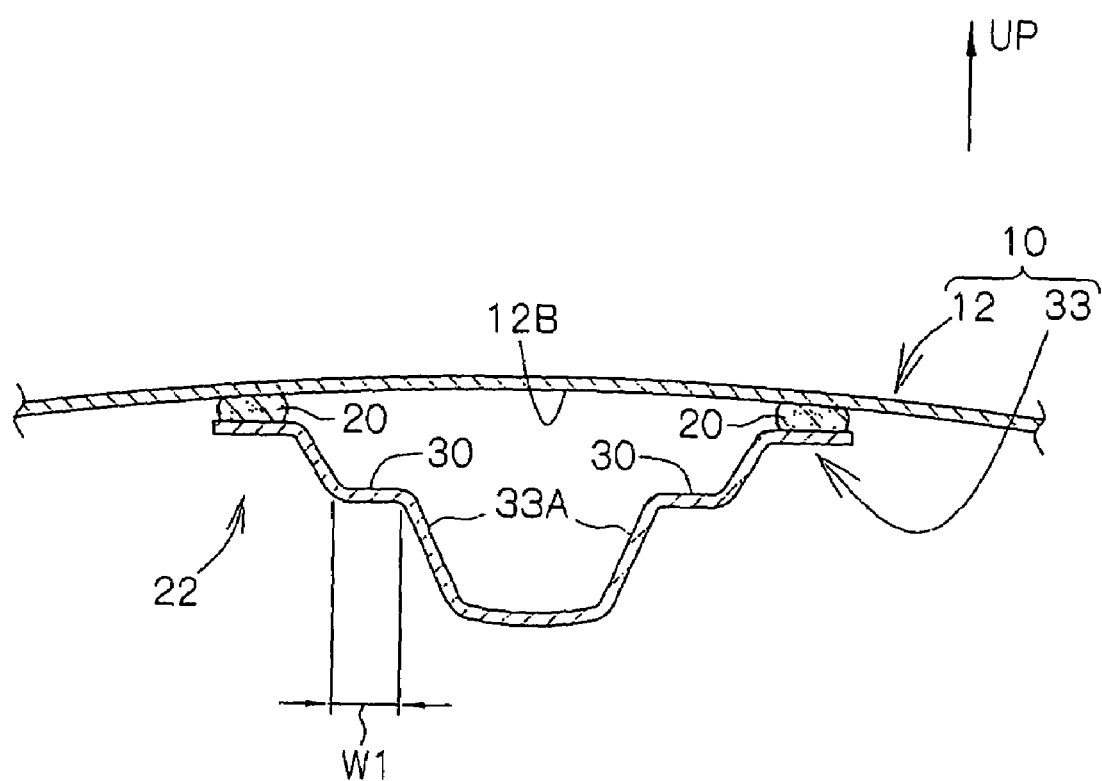
FIG. 8 is an enlarged sectional view taken along line 8-8 of FIG. 10.
Figure 9:
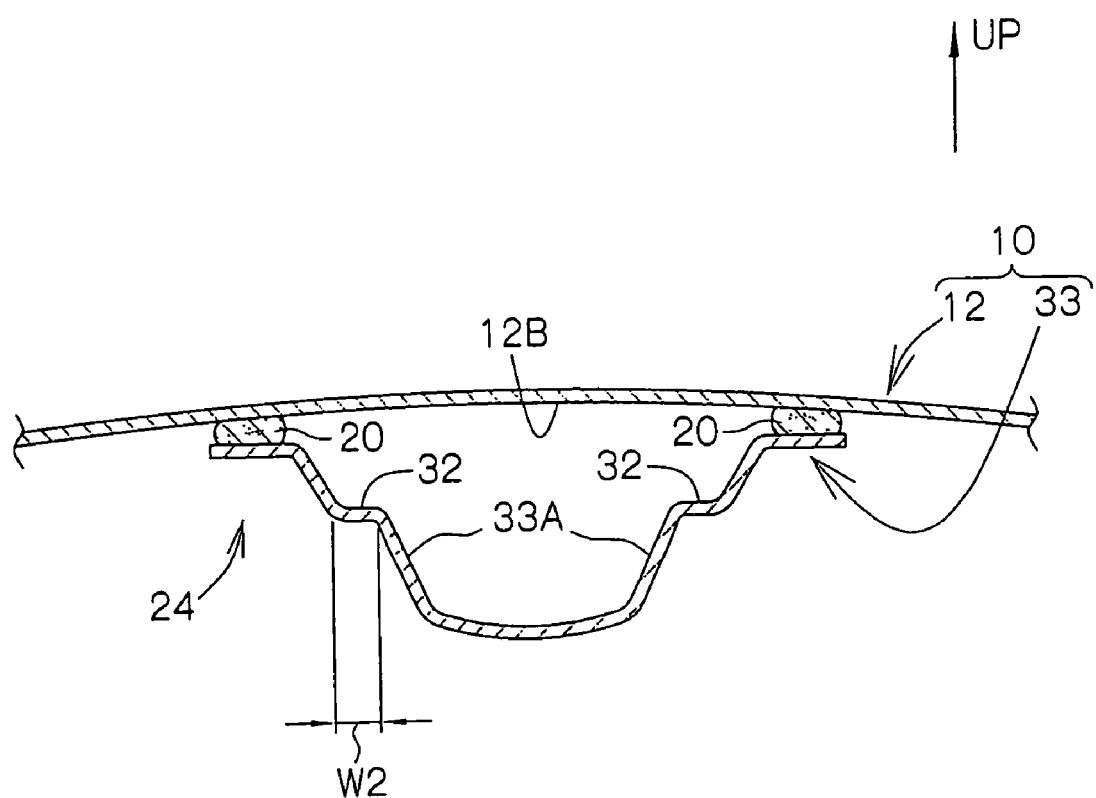
FIG. 9 is an enlarged sectional view taken along line 9-9 of FIG. 10.
Figure 10:
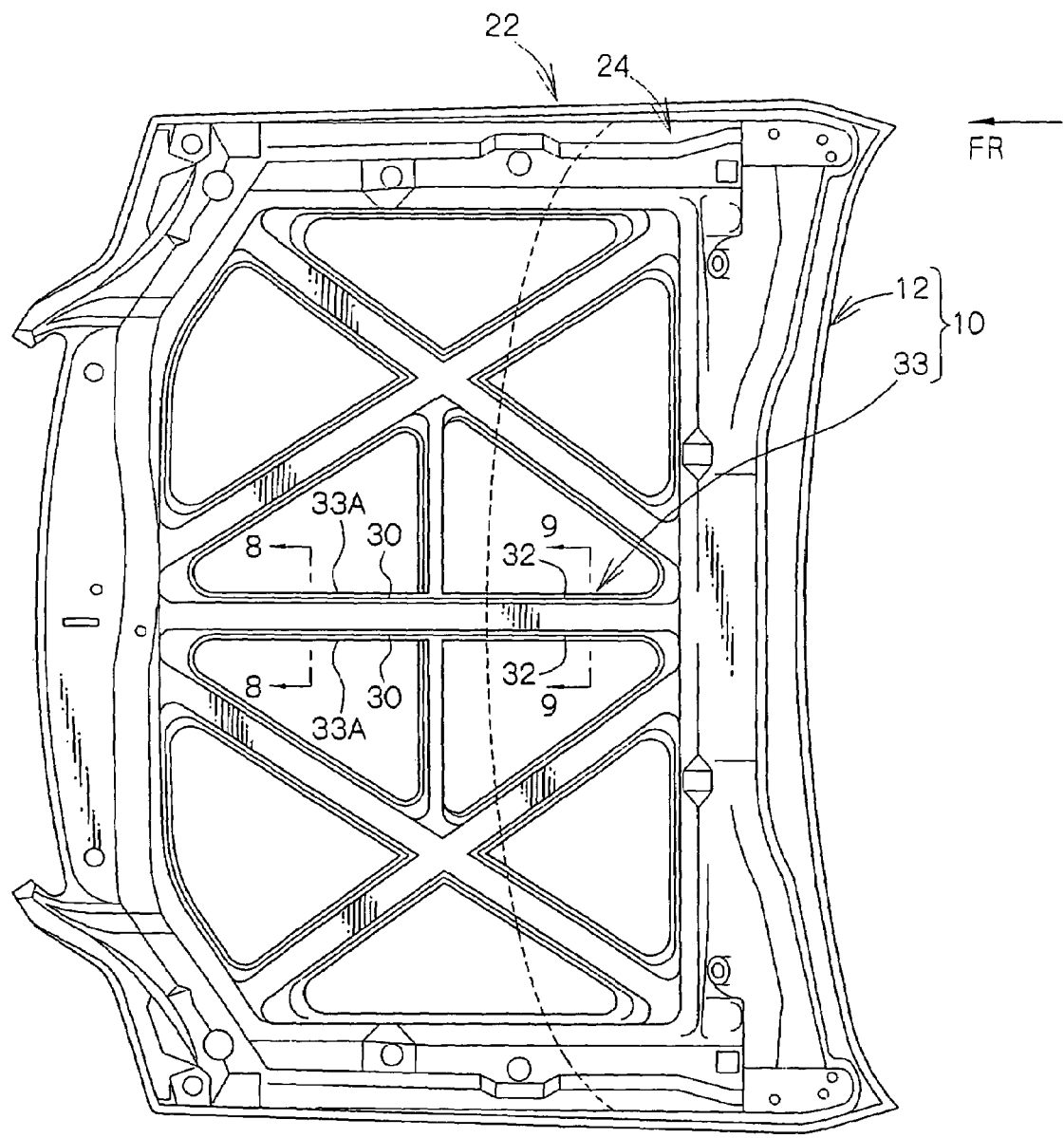
FIG. 10 is a plan view, as seen from below the vehicle body, showing a vehicle hood structure relating to a modified example of the first embodiment of the present invention.

Note that, in the present embodiment, the hood 10 illustrated in FIG. 4 is a completely hollow structure. However, instead, as shown in FIGS. 8 through 10, a structure may be used in which a hood inner panel 33 of the hood 10 is disposed along the reverse surface 12B of the hood outer panel 12, and the cross-sectional configuration, as seen from the vehicle longitudinal direction, is a hat-shaped frame (skeleton) structure whose open portion is directed upwardly, and the shelf portions 30, 32 are formed respectively along the vehicle longitudinal direction at side wall portions 33A of the hat-shaped cross-sectional configuration.

Next, a second embodiment of the vehicle hood structure in the present invention will be described in accordance with FIGS. 11 through 14.

Note that members which are the same as those of the first embodiment are denoted by the same reference numerals, and description thereof is omitted.

Figure 12:
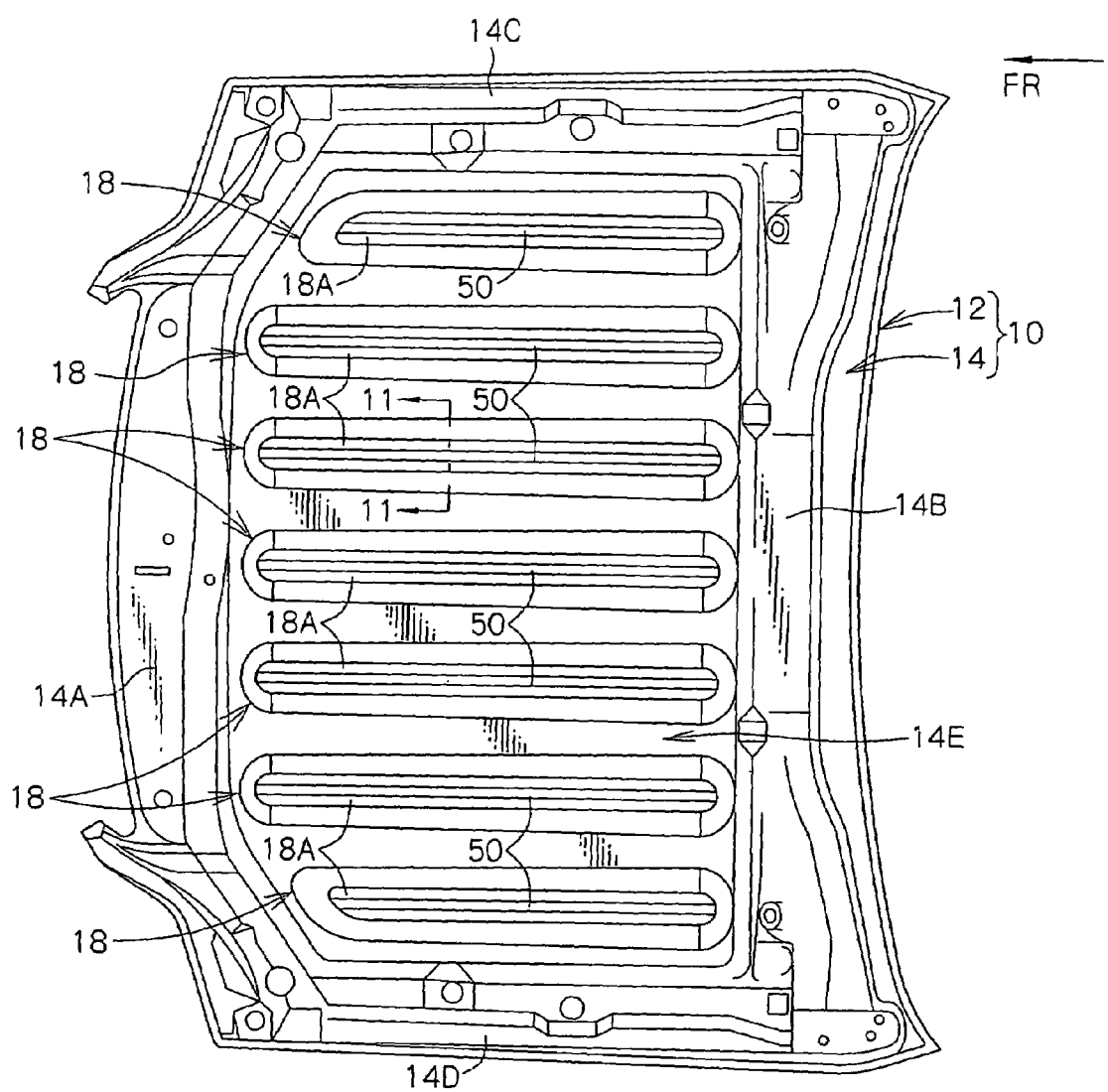
FIG. 12 is a plan view, as seen from below the vehicle body, showing a vehicle hood structure relating to a second embodiment of the present invention.

In the present embodiment, in place of the shelf portions 30, 32 (see FIG. 4) of the first embodiment, as shown in FIG. 12, recessed beads (beads which are concave toward the bottom of the vehicle body) 50 serving as rigidity strengthening portions are formed along the vehicle longitudinal direction at the vehicle transverse direction central portions of the peak portions 18A of the convex portions 18.

Figure 11:
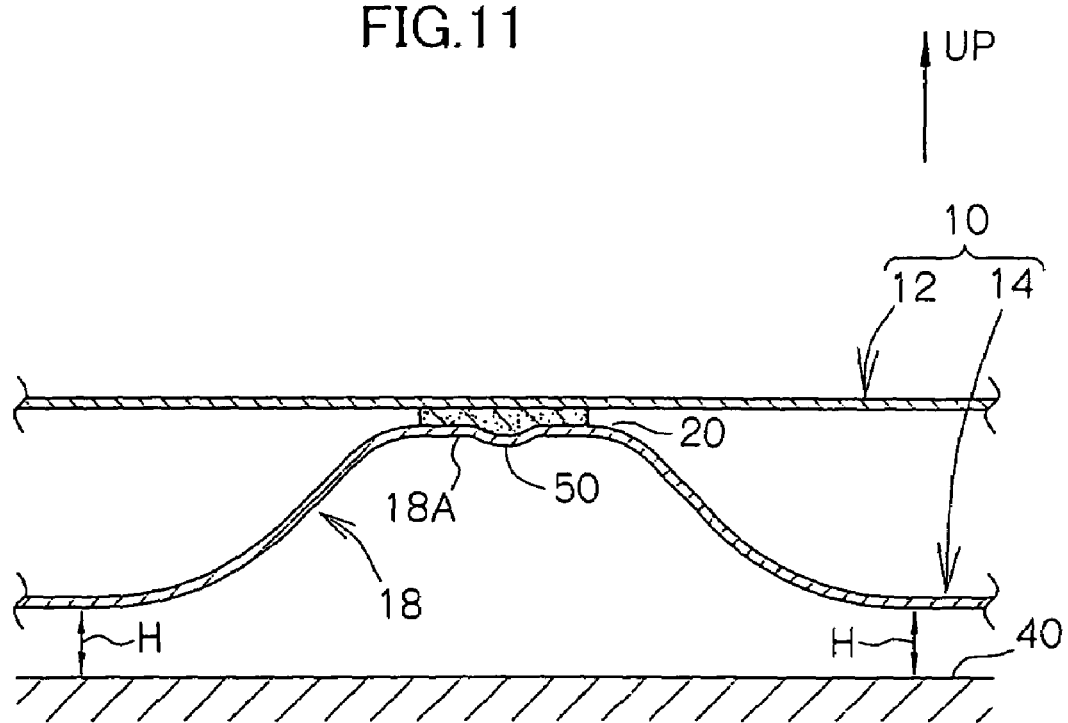
FIG. 11 is an enlarged sectional view taken along line 11-11 of FIG. 13.

The cross-sectional configuration of the recessed bead 50 shown in FIG. 11 is arc-shaped. The recessed bead 50 is a liquid pooling portion for a mastic adhesive which is used as the adhesive 20 for adhering the hood inner panel 14 and the hood outer panel 12 together.

Next, operation of the present embodiment will be described.

In the present embodiment, at the front half portion 22 of the hood inner panel 14, the recessed beads 50 are formed along the vehicle longitudinal direction at the vehicle transverse direction central portions of the peak portions 18A of the convex portions 18. Therefore, the rigidity of the front half portion 22 of the hood inner panel 14 is increased by these recessed beads 50. As a result, at the front half portion 22 of the hood inner panel 14, sufficient energy absorption at the time of a primary collision is possible, and therefore, the impact which the colliding body receives due to the secondary collision can be reduced.

Further, in the present embodiment, at the rear half portion 24 of the hood inner panel 14 as well, the recessed beads 50 are formed at the peak portions 18A of the convex portions 18. Thus, it is possible to keep the amount of deformation, toward the bottom of the vehicle, of the hood 10 at the rear half portion 24 of the hood inner panel 14 which portion tends to be collided by a colliding body having a large mass, from becoming large.

Figure 13:
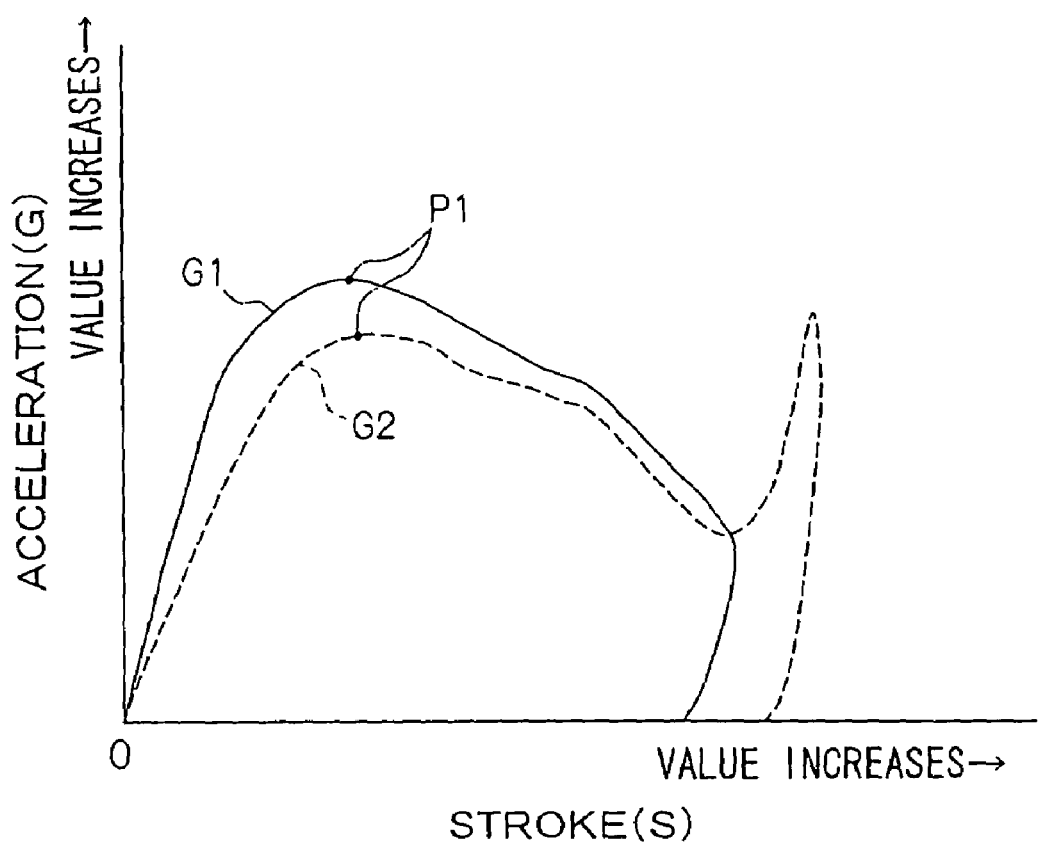
FIG. 13 is a graph showing the relationship between acceleration and the stroke of a colliding body in the vehicle hood structure relating to the second embodiment of the present invention.
Figure 14:
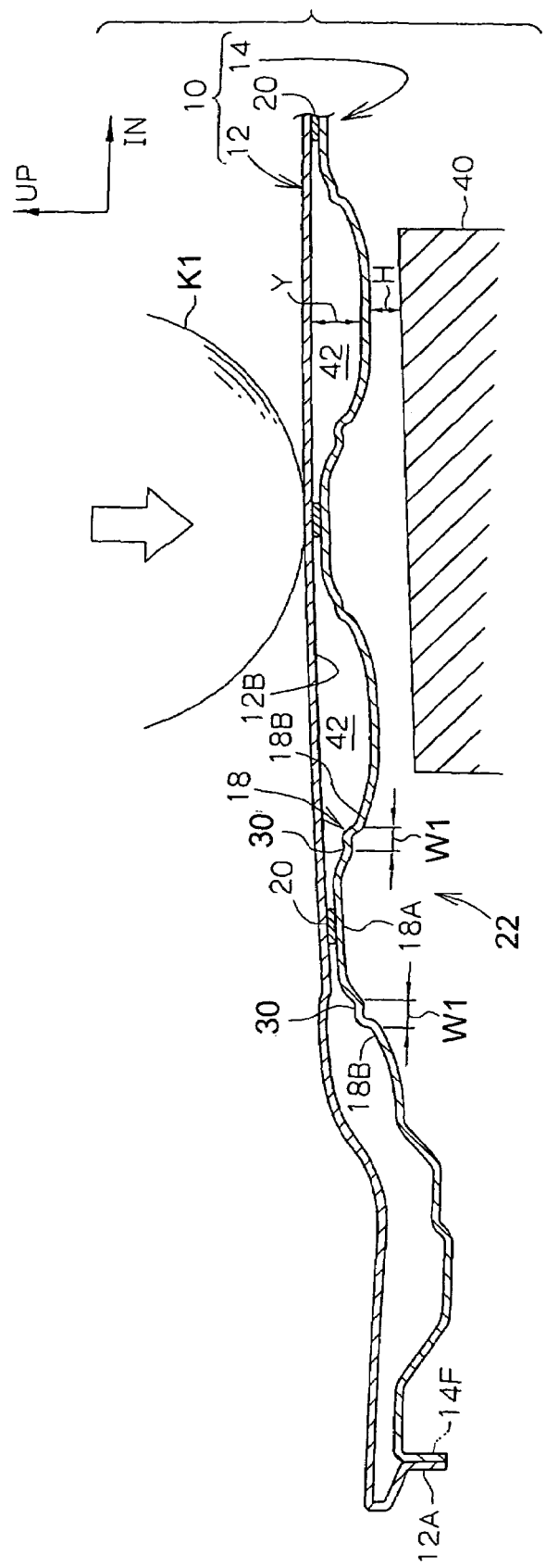
FIG. 14 is a cross-sectional view of hood inner panel, taken in the vehicle transverse direction, depicting one embodiment of width W1 of the shelf portions at a front half portion of the hood inner panel in the vehicle longitudinal direction.
Figure 15:
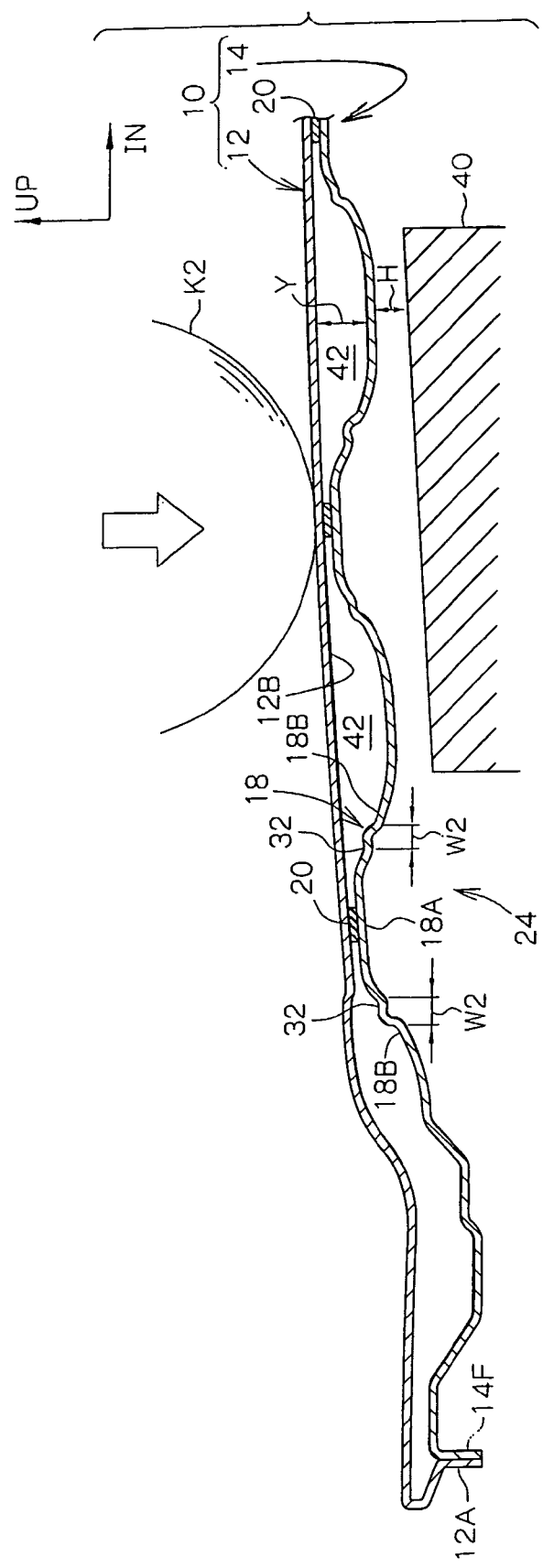
FIG. 15 is a cross-sectional view of the hood inner panel, taken in the vehicle transverse direction, depicting one embodiment of width W2 of the shelf portions at a rear half portion of the hood inner panel in the vehicle longitudinal direction, wherein W2 is equivalent to W1 at the front half portion of the hood inner panel in the vehicle longitudinal direction in FIG. 14.
Figure 16:
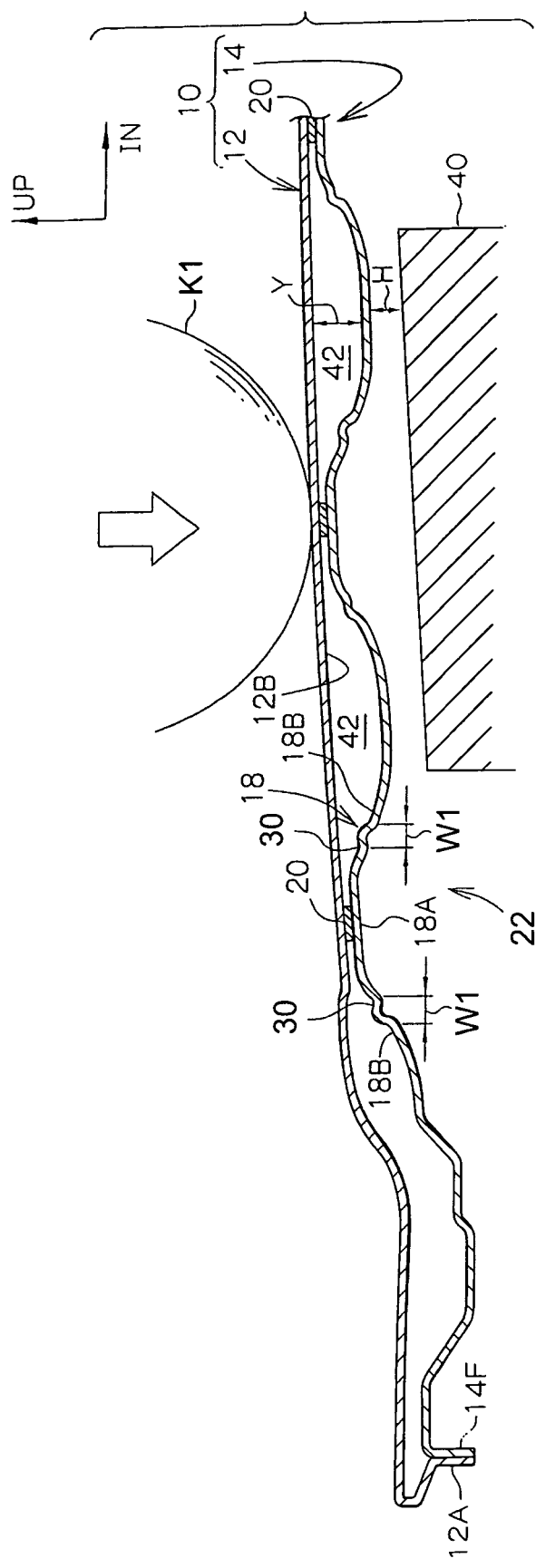
FIG. 16 is a cross-sectional view of the hood inner panel, taken in the vehicle transverse direction, depicting another embodiment of width W1 of the shelf portions at a front half portion of the hood inner panel in the vehicle longitudinal direction.
Figure 17:
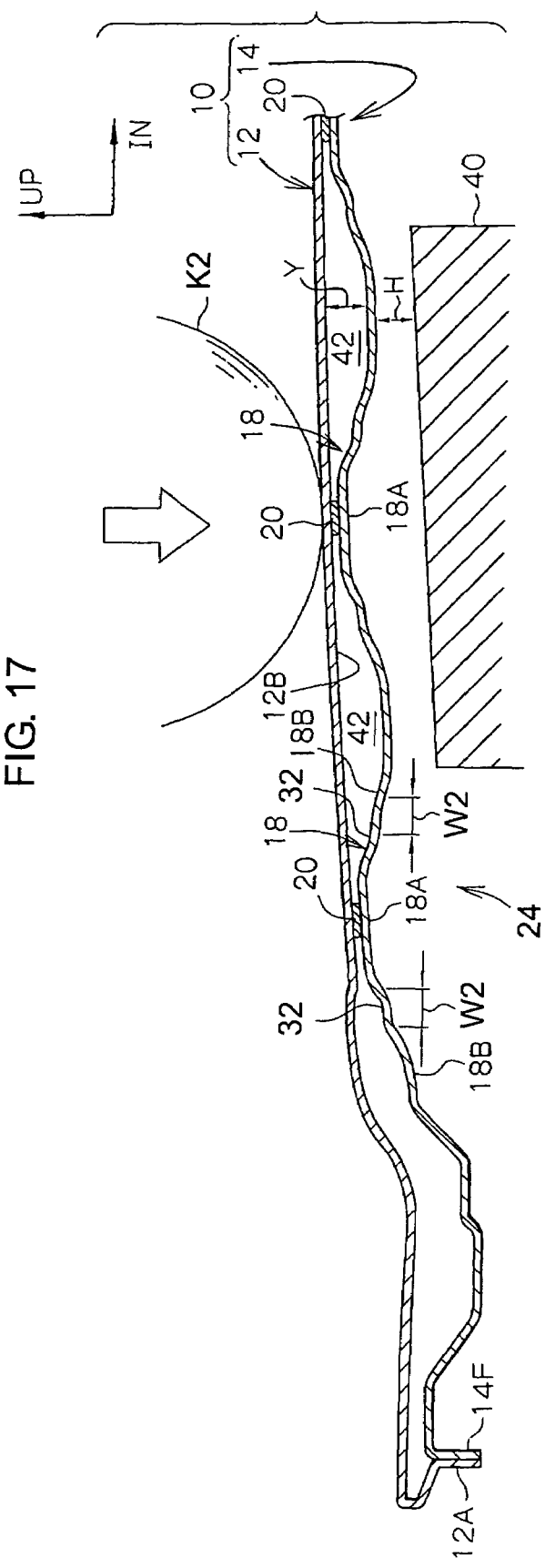
FIG. 17 is a cross-sectional view of the hood inner panel, taken in the vehicle transverse direction, depicting another embodiment of width W2 of the shelf portions at a rear half portion of the hood inner panel in the vehicle longitudinal direction, wherein W2 is wider than W1 at the front half portion of the hood inner panel in the vehicle longitudinal direction in FIG. 16.

As a result, as shown in FIG. 13, with regard to the change in the acceleration G1 in relation to the stroke S of a colliding body in the present embodiment, the rise at the initial stage of the collision is fast and the acceleration of the primary peak P1 is high therein, as compared with the change in the acceleration G2 in relation to the stroke S of the colliding body in a structure in which the recessed beads 50 are not formed. Accordingly, energy can be absorbed efficiently at the stage when the collision speed of the colliding body is fast. Therefore, when a colliding body collides with the member 40 under the hood, the acceleration G1 is a low, stable wave-shape, and not a wave-shape having a floor such as the acceleration G2.

Accordingly, in the present embodiment, the impact which a colliding body receives due to a secondary collision can be decreased over the entire region of the hood 10 corresponding to the front half portion 22 and the rear half portion 24 of the hood inner panel 14.

Moreover, in the present embodiment, the recessed beads 50 which are formed at the peak portions 18A of the convex portions 18 of the hood inner panel 14 can be used as liquid pooling portions for the mastic adhesive which is used as the adhesive 20 for adhering the hood inner panel 14 and the hood outer panel 12 together.

The present invention has been described above with reference to specific embodiments. However, the present invention is not limited to these embodiments, and it will be apparent to those skilled in the art that other various embodiments are possible within the scope of the present invention.

For example, in the first embodiment, a structure may be used in which the angles of inclination of the shelf portions 30 at the front half portion 22 of the hood inner panel 14 and the angles of inclination of the shelf portions 32 at the rear half portion 24 of the hood inner panel 14 are different.

Further, the shelf portions 30 at the front half portion 22 of the hood inner panel 14 and the shelf portions 32 at the rear half portion 24 of the hood inner panel 14 may be formed in the same configurations.

Moreover, a structure is possible in which the recessed beads 50 of the second embodiment are formed at the peak portions 18A of the convex portions 18 having the shelf portions 30, 32 of the first embodiment, such that control of the impact absorbing ability can be improved even more.

What is claimed is:

1. A vehicle hood structure comprising:
    a hood outer panel structuring a vehicle body outer side surface of a hood;
    a hood inner panel disposed along an entire region of a reverse surface of the hood outer panel, said hood inner panel including convex portions formed along a vehicle longitudinal direction at intervals in a vehicle transverse direction and concave portions formed along a vehicle longitudinal direction at intervals in a vehicle transverse direction, said convex portions including side wall portions, each side wall portion positioned between a peak of the convex portion and a trough of an adjacent concave portion; and
    a rigidity strengthening portion formed along the vehicle longitudinal direction at an intermediate portion of each of the side wall portions and configured as a shelf portion, said shelf portion comprising a first portion generally parallel to said hood outer panel, joined to a second portion generally transverse to said hood outer panel.

2. The vehicle hood structure of claim 1, wherein a width (W2), in a vehicle transverse direction, of the shelf portion at a rear half portion of the hood inner panel in the vehicle longitudinal direction is narrower than a width (W1), in the vehicle transverse direction, of the shelf portion at a front half portion of the hood inner panel in the vehicle longitudinal direction.

3. The vehicle hood structure comprising:
    a hood outer panel structuring a vehicle body outer side surface of a hood;
    a hood inner panel disposed alone an entire region of a reverse surface of the hood outer panel, said hood inner panel including convex portions formed along a vehicle longitudinal direction at intervals in a vehicle transverse direction and said convex portions including side wall portions; and
    a rigidity strengthening portion formed along the vehicle longitudinal direction of the side wall portions of the convex portions of the hood inner panel, comprising a shelf portion, said shelf portion comprising a first portion generally parallel to said hood outer panel, joined to a second portion generally transverse to said hood outer panel,
    wherein a width (W2), in a vehicle transverse direction, of the shelf portion at a rear half portion of the hood inner panel in the vehicle longitudinal direction is equivalent to a width (W1), in the vehicle transverse direction, of the shelf portion at a front half portion of the hood inner panel in the vehicle longitudinal direction.

4. The vehicle hood structure comprising:
    a hood outer panel structuring a vehicle body outer side surface of a hood;
    a hood inner panel disposed along an entire region of a reverse surface of the hood outer panel, said hood inner panel including convex portions formed along a vehicle longitudinal direction at intervals in a vehicle transverse direction and said convex portions including side wall portions; and
    a rigidity strengthening portion formed along the vehicle longitudinal direction of the side wall portions of the convex portions of the hood inner panel, comprising a shelf portion, said shelf portion comprising a first portion generally parallel to said hood outer panel, joined to a second portion generally transverse to said hood outer panel,
    wherein a width (W2), in a vehicle transverse direction, of the shelf portion at a rear half portion of the hood inner panel in the vehicle longitudinal direction is wider than a width (W1), in the vehicle transverse direction, of the shelf portion at a front half portion of the hood inner panel in the vehicle longitudinal direction.

5. The vehicle hood structure of claim 3, wherein angles of inclination of the shelf portion at a front half portion of the hood inner panel in the vehicle longitudinal direction are different than angles of inclination of the shelf portion at a rear half portion of the hood inner panel in the vehicle longitudinal direction.

6. A vehicle hood structure comprising:
    a hood outer panel structuring a vehicle body outer side surface of a hood;
    a hood inner panel disposed along an entire region of a reverse surface of the hood outer panel, said hood inner panel including convex portions formed along a vehicle longitudinal direction at intervals in a vehicle transverse direction and said convex portions including side wall portions; and
    a rigidity strengthening portion formed along the vehicle longitudinal direction of the side wall portions of the convex portions of the hood inner panel, comprising a shelf portion, said shelf portion comprising a first portion generally parallel to said hood outer panel, joined to a second portion generally transverse to said hood outer panel, wherein,
    the hood inner panel has a front part and a rear part in the vehicle longitudinal direction, the front part and the rear part are divided with an imaginary border line (L) that is located at an intermediate part in the vehicle longitudinal direction of the hood inner panel and has an arc shape defining along a front end edge portion of the hood, and
    a width (W2) of the shelf portion at the rear part of the hood inner panel is narrower than a width (W1) of the shelf portion at the front part of the hood inner panel.

* * * * *